United States Patent [19]

Wassermann

[11] 3,791,498
[45] Feb. 12, 1974

[54] DEVICE FOR THE FRICTIONAL INTERCONNECTION OF TWO STRUCTURAL PARTS

[76] Inventor: Hans Wassermann, Sonnenhugelstrasse 62, Arbon, Switzerland

[22] Filed: May 23, 1972

[21] Appl. No.: 256,181

[30] Foreign Application Priority Data
June 7, 1971 Switzerland .............................. 8302

[52] U.S. Cl. .................... 192/57, 73/134, 188/271, 188/290, 188/264 E, 188/264 P, 192/58 C, 192/113 B
[51] Int. Cl. ........................................... F16d 25/00
[58] Field of Search .... 188/271, 290, 264 E, 264 P, 188/71.6; 192/113 B, 57, 58 C; 73/134, 135

[56] References Cited
UNITED STATES PATENTS
| | | | |
|---|---|---|---|
| 1,718,175 | 6/1929 | Nilson | 188/290 |
| 3,302,755 | 2/1967 | Botterill et al. | 188/271 |
| 3,580,369 | 5/1971 | Heck | 188/264 E |
| 3,696,898 | 10/1972 | Sommer | 192/58 C X |

FOREIGN PATENTS OR APPLICATIONS
284,824  2/1928  Great Britain ...................... 188/290

Primary Examiner—George E. A. Halvosa
Attorney, Agent, or Firm—McGlew and Tuttle

[57] ABSTRACT

The device is used for the frictional interconnection of two structural parts at least one of which is rotatable about an axis, and includes a plurality of substantially parallel disks coaxial with this axis and connected non-rotatably and in alternation to the respective structural parts and displaceable axially to effect engagement and disengagement of axially adjacent disks with each other. The disks have openings therethrough so arranged that at least a part of the openings in all the disks coincide at least partly in certain relative angular positions of the parts to form passages extending through the assembly of disks. An impeller is connected to rotate with a rotatable part, and circulates a working fluid, such as a cooling fluid, through these passages so that a hydrodynamic interconnection and a frictional interconnection of the two parts may be effected. The device is usable either as a truck brake or as a clutch.

5 Claims, 4 Drawing Figures

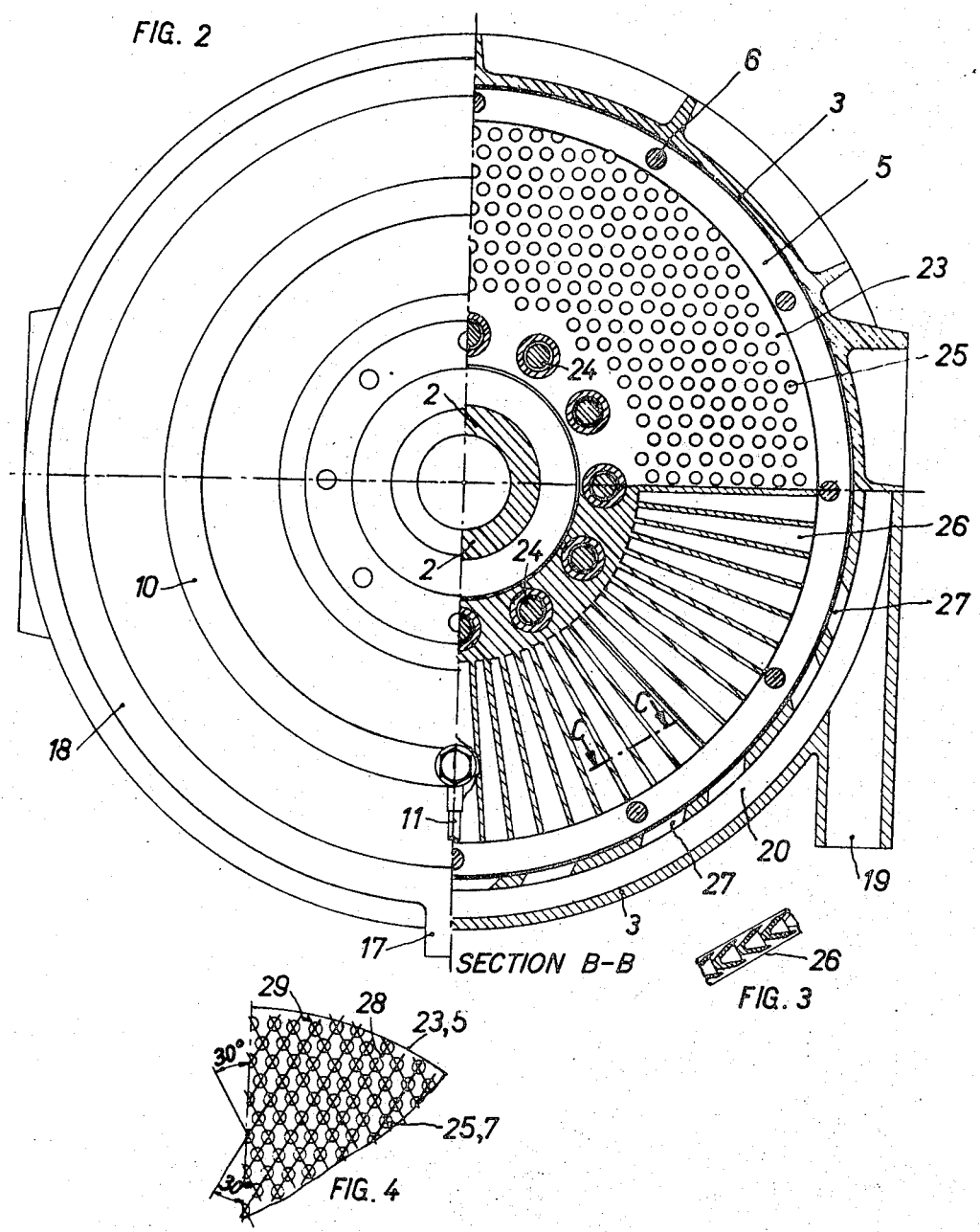

DEVICE FOR THE FRICTIONAL INTERCONNECTION OF TWO STRUCTURAL PARTS

BACKGROUND OF THE INVENTION

The present invention is directed to a device for the frictional interconnection of two structural parts of which at least one is rotatable about an axis. The device includes several substantially parallel disks coaxial with this axis and connected non-rotatably and in alternation to the respective structural parts and displaceable axially to effect engagement and disengagement of axially adjacent disks relative to each other. Known devices of this type preferably are used as multiple disk brakes or as multiple disk clutches.

Brakes used on trucks should be designed both for intermittent and for continuous operation and, in addition, should permit braking until the truck stops. The known brakes which permit intermittent and continuous operation, such as motor brakes, for example, electric eddy current brakes and hydrodynamic brakes, can not brake a vehicle to a stop.

With known friction brakes, it is possible to brake a vehicle to a stop, but these brakes do not permit a continuous operation because the heat generated cannot be eliminated. Friction brakes with indirect water cooling are known, but these are subject to great wear, despite a relatively low continuous brake power. In addition, they require careful maintenance as otherwise their operation is impaired. For these reasons, friction brakes with indirect water cooling have found only limited use.

SUMMARY OF THE INVENTION

The primary objective of the present invention is to eliminate or obviate the above-mentioned disadvantages, and to provide a device, for the frictional interconnection of two structural parts at least one of which is rotatable about an axis, which device works reliably and substantially free of wear and maintenance.

The problem thus is to design the device so that the frictional interconnection between the two parts is effected both by hydrodynamic processes and by forces which are produced by liquid, dry or mixed friction, and where the heat generated is eliminated directly by means of a working medium.

For the solution of this problem, the device is provided with disks which have openings therethrough which are so arranged that at least part of the openings of all the disks coincide at least partly in certain relative angular positions of the parts so that they form passages extending through the disk assembly in an axial direction for the flow of a current of working fluid.

An object of the invention is to provide an improved device for the frictional interconnection of two structural parts at least one of which is rotatable about an axis.

Another object of the invention is to provide such a device including a plurality of substantially parallel disks coaxial with the axis of the rotatable part and connected non-rotatably and in alternation to the respective structural parts as well as being displaceable axially to effect engagement and disengagement of axially adjacent disks relative to each other.

A further object of the invention is to provide such a device which works reliably and substantially free of wear and maintenance.

Another object of the invention is to provide such a device in which frictional interconnection of the two parts is effected both by hydrodynamic processes and by forces which are produced by liquid, dry or mixed friction.

A further object of the invention is to provide such a device wherein the heat generated by friction is eliminated directly by means of a circulating working medium.

For an understanding of the principles of the invention, reference is made to the following description of a typical embodiment thereof as illustrated in the accompanying drawings.

BRIEF DESCRIPTION OF THE DRAWINGS

FIG. 2 is a sectional view taken along the lines A—A and B—B of FIG. 1;

FIG. 3 is a sectional view taken along the line C—C of FIG. 2; and

FIG. 4 is a partial elevation view of a brake disk shown in FIG. 2.

DESCRIPTION OF THE PREFERRED EMBODIMENT

Figure 1:
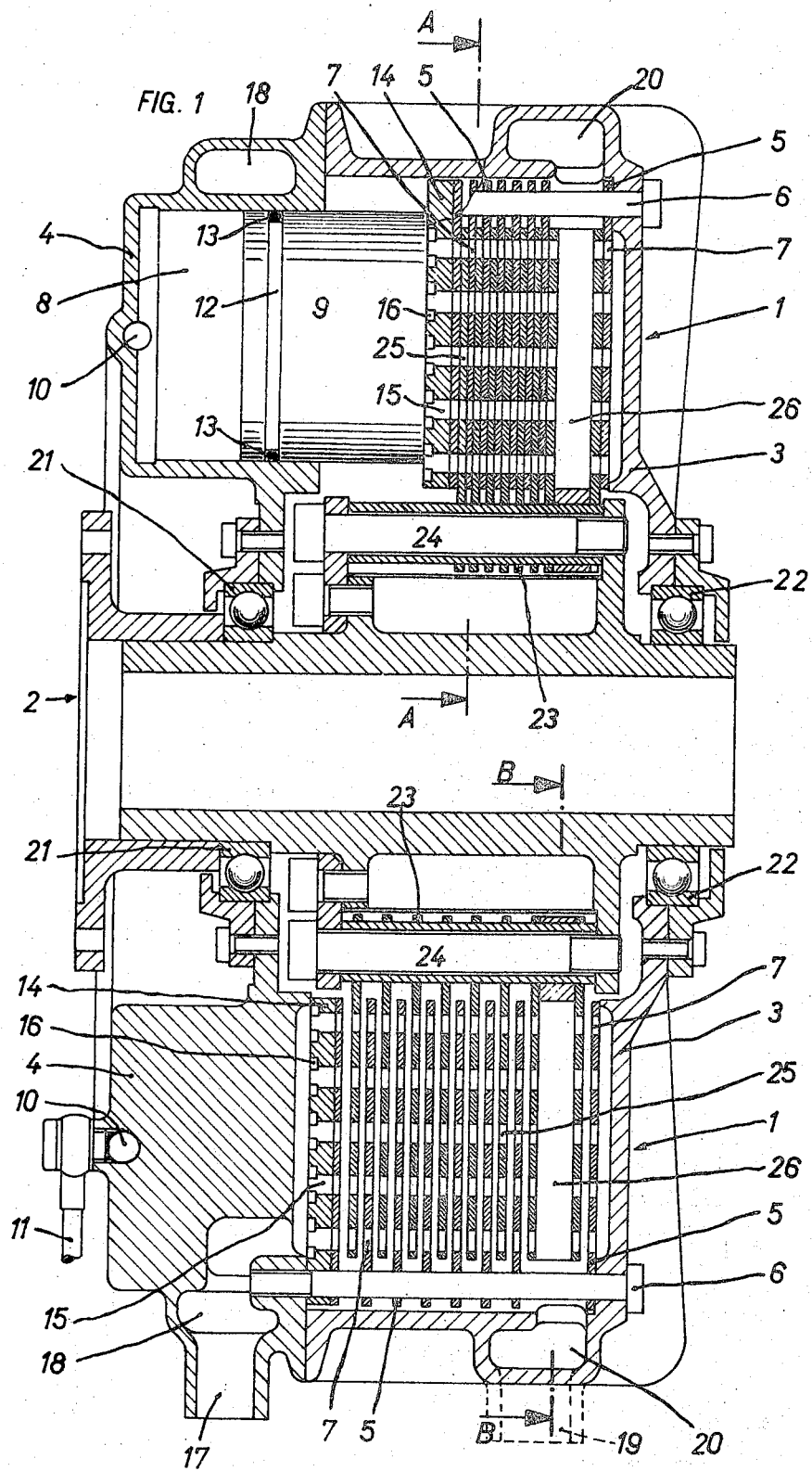
FIG. 1 is an axial sectional view through a braking device embodying the invention.

The braking device illustrated in FIG. 1 comprises substantially a stator 1 and a hollow rotor shaft 2. Stator 1 is formed by a stator housing 3 with a cover 4 closing the housing on one side. In the housing 3, there are arranged circular stator brake disks 5 preferably made of tempered steel. The substantially parallel brake disks 5 are coaxial with the longitudinal axis of stator housing 3, and are guided for displacement in the axial direction by means of elongated bolts 6 secured in stator 1 and fixed against rotation relative to the stator. Each of the brake disks 5 has openings 7 arranged in the same pattern, and brake disks 5 are so arranged, in stator housing 3, that the openings 7 in all of the disks 5 are aligned in an axial direction.

The cover 4 closing housing 3 has chambers 8 distributed uniformly around its circumference, and these chambers constitute cylinders receiving pistons 9 displaceable parallel to the axis of stator 1. Chambers 8 are connected, through a distribution line 10, with a supply line 11 for a pressure medium, for example, oil, for operating pistons 9. Each piston 9 has an annular slot 12 in which there is seated a gasket 13 bearing on the inner cylindrical wall of the associated chamber 8.

Pistons 9 act on a circular plate 14 positioned parallel to brake disks 5 and guided for axial displacement by the longitudinally extending bolts 6. Plate 14 is formed with bores 15 aligned with the openings 7 of brake disks 5, and which can be supplied, through a slot arrangement 16, with a working fluid whose function will be described below. This working fluid is supplied to stator 1 from the exterior through a supply line 17 connected, through a distribution line 18 in cover 4, with slot arrangement 16. Slot arrangement 16 effects even or uniform distribution of the working fluid to the bores 15. At the end of the brake disk assembly opposite plate 14 there is arranged, in stator housing 3, a discharge line 19 connected to a collecting pipe 20 communicating with the openings 7 in the disks 5. Supply line 17 and discharge line 19, for the working fluid, are interconnected with each other through a pipe-and-cooling system which has not been shown and which, in turn, is connected to a tank, which also has not been shown.

Rotor shaft 2 is rotatably mounted in housing 3 through the medium of two antifriction bearings, such as ball bearings 21 and 22, and carries substantially parallel circular rotor brake disks 23, preferably of tempered steel. Rotor brake disks 23 are coaxial with the axis of rotation of rotor shaft 2 and with the axes of stator brake disks 5. Rotor brake disks 23 are displaceable axially on longitudinally extending bolts 24 secured to rotor shaft 2, these bolts serving as guides for rotor brake disks 23 and preventing rotation thereof relative to rotor shaft 2. Brake disks 5 and 23 are so arranged, in a pack or assembly, that rotor brake disks 23 alternate with stator brake disks 5.

Rotor brake disks 23 have openings 25 which are arranged in the same pattern, and preferably are of the same size, as the openings 7 of stator brake disks 5. Brake disks 23 are so connected with rotor shaft 2 that their openings 25 are aligned in the direction of the axis of rotor shaft 2. As shown in FIG. 1, openings 7 and 25 coincide, in certain relative angular positions of stator 1 and rotor shaft 2, and form passages for the working fluid, these passages extending in the axial direction.

At one end, rotor shaft 2 carries a pump impeller 26 which is arranged opposite collecting pipe 20 in stator housing 3, and which serves to move the working fluid through the pack or assembly of brake disks and through pipe 20 and the cooling system.

The upper half of FIG. 1 illustrates the braking device during a braking operation, where brake disks 5 and 23 are brought into engagement with each other by pistons 9. The bottom half of FIG. 1 illustrates the braking device in the disengaged position. Brake disks 5 and 23 are pressed apart, after the braking operation, by spring units (not shown) associated with the brake disks, while plate 14 and pistons 9 return, at the same time, to their retracted positions.

FIG. 2 illustrates, in the upper half, a section along the line A—A of FIG. 1 and, in the lower half, a section along the line B—B of FIG. 1. The section A—A through the braking device illustrates rotor shaft 2 and one of the rotor brake disks 23 connected with shaft 2 by the bolts 24 as well as showing stator housing 3 with guide bolts 6 for the stator brake disks 5. The arrangement of the openings 25 of the rotor brake disk 23 visible in FIG. 2 is characteristic of all the brake disks 5 and 23, and will be described more fully in connection with FIG. 4.

The section B—B is through the pump impeller 26, shown in the bottom half of FIG. 2, and this pump impeller is connected by means of bolts 24 non-rotatably and axially displaceably with rotor shaft 2. Also illustrated in the section B—B is the collecting pipe 20 provided in stator housing 2 and which is connected to discharge line 19. The collecting pipe 20 is in communication with the space containing the pack or assembly of brake disks, through ports 27 which permit working fluid flowing through the pack of brake disks to enter collecting pipe 20.

The left half of FIG. 2 is a front view of the braking device, the feed line 11 and the distribution duct 10 for the pressure medium for operating pistons 9, as well as the feed or supply line 17 and the distribution line for conduit 18 for the working fluid.

FIG. 3 is a section through pump impeller 26 along line C—C of FIG. 2, and it will be noted that the radial blades of impeller 26 have a V or a U cross section, closed in the circumferentially direction, this cross section being particularly suitable for the laterally open pump impeller 26.

FIG. 4 illustrates a part of the rotor brake disk 23 illustrated in FIG. 2, with the openings 25. The represented arrangement of openings 25 is characteristic of all rotor brake disks 23 as well as of all stator brake disks 5. The centers of the openings are arranged on two families 28 and 29 of parallel lines, the lines of one family forming, with the lines of the other family, an angle of 60°. The interval or spacing between the parallel lines, within each family as well as for both families, is the same, and is so selected that the centers of three adjacent openings form an equilateral triangle whose side length is equal to or less than twice the diameter of the openings.

In the disengaged position of the brake, brake disks 5 and 23 are spaced from each other, as shown in FIG. 1, and the entire working fluid is contained in the above-mentioned separate tank to which the pipe and cooling system is connected. The drag power is thus negligible.

For starting the braking operation, working fluid is initially introduced by known means, such as a pump, a separate source of fluid under pressure, etc., into the system including the brake disks, the piping, and the cooling system. This working fluid is circulated by pump impeller 26. When flowing through openings 7 and 25, it is accelerated and decelerated alternately, in the circumferential direction, so that a resistance force is formed impeding rotary movement of brake disks 23. This resistance force increases with the increasing amount of working fluid which fills the pack of brake disks and the pipe and cooling system, and sets the working fluid in circulation.

A resistance force increasing likewise with this amount, that is, with the liquid level in the pack of disks, is formed by internal friction (viscosity) of the working fluid, which is contained in the gaps between the rotating and stationary brake disks. This last mentioned resistance force depends furthermore on the size of the gap between the brake disks, which can be varied by means of pistons 9 as a function of the pressure of the medium fed through line 11 and distribution duct 10. With increasing pressure on pistons 9, the size of the gaps between the brake disks diminishes until a mixed fluid-dry friction is formed between the brake disks. With even higher pressures, there is only dry friction. This state is used primarily for keeping the vehicle stationary, that is, with the brake locked, the size of the locking force being determined by the amount of pressure acting on pistons 9.

Since the openings 7 of the stator brake disks 5 are aligned with each other in an axial direction, and since the openings 25 of the rotor brake disks 23 are aligned with each other in the axial direction, at least a part of the openings of all brake disks coincide, at least partly, in certain relative angular positions of stator 1 and rotor shaft 2, so that axial passages are formed through which the working fluid can flow from distribution line 18, through the bores 15 of plate 14 to impeller pump 26, and from there into collecting pipe 20, even if the brake disks practically are in engagement with each other, so that the first mentioned resistance force is maintained.

Each opening 25 of each rotor brake disk 23, filled with working fluid, moves past parts of the surface of the adjacent bearing stator brake disks 5. On the surface of the adjacent brake disks 5 and 23 there is generated heat by the mutual movement in the state of mixed or dry friction. The working fluid contained in the openings 25 of rotor brake disks 23, passing by the heated surfaces of stator brake disks 5, now absorbs heat from the affected parts of the surfaces of stator brake disks 5. Correspondingly, heat is eliminated from the surfaces of the moving rotor brake disks 23 by the working fluid contained in the openings 7 of the stator brake disks 5.

In the subsequent relative angular position of stator 1 and rotary shaft 2, in which openings 7 and 25 form passages, as described above, new working fluid flows from plate 14 into these passages so that the working fluid contained in the openings is ejected and is supplied by pump impeller 26 through collecting pipe 20 to discharge line 19. Any heat which was not absorbed directly by the working fluid on the disk surfaces, and which arrives, by heat conduction, on the surfaces of the openings, is transferred there. After this working fluid is cooled in a cooler of the pipe and cooling system, it is returned through supply line 17 to slot arrangement 16, which distributes the working fluid over the bores 15 of plate 14. This prevents excessive heating of the brake disks, both in intermittent braking operation and in continuous braking operation.

In order to achieve a good heat flow over the entire brake disk surface, the openings must be so arranged that all parts of the brake disk surfaces come in contact with the working fluid, and that each opening participates periodically in the formation of a passage, so that the heated working fluid can be ejected. The arrangement of the openings described in connection with FIG. 4 meets these requirements and yields a favorable ratio of friction-surface to opening-surface. However, it is possible to obtain similar favorable results with an arrangement of the openings different from the arrangement described above.

The above-described braking device works in a first braking phase, primarily as a hydrodynamic brake and, in a second braking phase, primarily as a multiple disk friction brake, where the heat generated by dry or mixed friction is eliminated by the working fluid.

The working fluid must be fed as a current through the pack of brake disks. In the present embodiment, this current is produced by pump impeller 26. However, it is also possible to produce the current flow by other means.

Instead of pistons 9, other suitable means can be used for compressing the brake disks.

The described device can also be used as a clutch instead of a brake. In such instance, instead of being connected to a stationary stator, disks 5 can be connected to a drive shaft which is driven by rotor shaft 2 through disks 5 and 23 not acting as clutch disks.

Transmission of torque from the drive shaft to the driven shaft is effected, in the disengaged position of the clutch, in a manner similar to the manner of the brake, primarily hydrodynamically, where disks, which are practically in contact with each other, are connected hydromechanically and strictly mechanically.

The heat of friction generated during the coupling operation is eliminated in the same way as in the brake, by the working fluid.

The device can also be designed as a combination brake and clutch but, in this case, a disengageable locking mechanism must be provided for the stator.

While a specific embodiment of the invention has been shown and described in detail to illustrate the application of the principles of the invention, it will be understood that the invention may be embodied otherwise without departing from such principles.

What is claimed is:

1. A device, for the frictional interconnection of first and second structural parts, at least one of which is rotatable about an axis, including a plurality of substantially parallel disks coaxial with such axis and connected non-rotatably and in alternation to the respective structural parts and displaceable axially to effect engagement and disenagement of axial adjacent disks relative to each other, said device comprising, in combination, said first structural part being a housing and said second structural part being a shaft rotatably mounted in said housing for relative rotation of said housing and said shaft about the axis of said shaft; said disks having symmetrically located openings therethrough so arranged that at least a part of the openings in all the disks coincide at least partly in certain relative angular positions of said parts to form passages extending axially through the assembly of disks; all of said openings being circular and of substantially the same size; all those disks connected non-rotatably to said housing having their openings aligned in the direction of the axis of rotation, and all those disks connected non-rotatably to said shaft having their openings aligned in the direction of the axis of rotation; a working fluid inlet adjacent one axial end of said housing; a working fluid outlet adjacent the opposite axial end of said housing; a plate arranged parallel to said disks at that end of the assembly of disks adjacent said one axial end of said housing and displaceable in the direction of the axis of relative rotation; means connecting said plate non-rotatably with one of said structural parts; said plate being formed with bores therethrough each in alignment with a respective opening in an adjacent disk connected non-rotatably to said one structural part; said plate being formed with a slot arrangement communicating with said working fluid inlet for distributing the working fluid through said bores and the openings of said disks; means engageable with said plate and operable to displace said plate axially to displace said disks axially into engagement with each other; and a pump impeller connected non-rotatably to said shaft adjacent the disk assembly and adjacent said axially opposite end of said housing; said pump impeller having radially extending impeller blades communicating axially with the openings in said disks and communicating, at their radially outer ends, with said working fluid outlet.

2. A device for the frictional interconnection of two structural parts, as claimed in claim 1, in which said means operable to displace said plate comprises plural fluid pressure actuators each including a cylinder formed in said housing and a piston engageable with said plate, said actuators being arranged at equiangular distances from each other relative to said plate; a pressure fluid inlet connected to said housing; and a conduit commonly connecting said pressure fluid inlet to all of said actuators.

3. A device for the frictional interconnection of two structural parts, as claimed in claim 1, in which said housing is formed with an annular conduit extending peripherally thereof adjacent said opposite axial end of said housing and communicating with said impeller blades and with said working fluid outlet.

4. A device for the frictional interconnection of two structural parts, as claimed in claim 1, in which, in each disk, the centers of adjacent openings form equilateral triangles having a side length not exceeding twice the diameter of the openings.

5. A device for the frictional interconnection of two structural parts, as claimed in claim 1, in which said radially extending impeller blades have channel cross sections facing in the same direction, said blades being spaced from each other to provide for lateral flow of fluid into said channel cross sections while inhibiting flow of fluid circumferentially of said impeller.

* * * * *